United States Patent [19]

Andreyko

[11] Patent Number: 4,892,212
[45] Date of Patent: Jan. 9, 1990

[54] WALL BRACKET FOR MOUNTING AN ELECTRICAL CONNECTOR

[76] Inventor: Norman J. Andreyko, 34 Norgrove Crescent, Etobicoke, Ontario, Canada, M9P 3C6

[21] Appl. No.: 261,864
[22] Filed: Oct. 25, 1988
[51] Int. Cl.[4] .............................................. H02B 1/02
[52] U.S. Cl. ...................................... 220/3.3; 220/3.5; 220/3.2; 220/241; 174/58
[58] Field of Search .................... 220/3.5, 3.6, 3.4, 3.3, 220/3.2, 241; 174/54, 55, 58; 248/DIG. 6

[56] References Cited

U.S. PATENT DOCUMENTS

| 2,448,359 | 8/1948 | Davison | 248/DIG. 6 |
|---|---|---|---|
| 2,788,187 | 4/1957 | Cookson | 248/DIG. 6 |
| 3,380,612 | 4/1968 | Mossburg | 220/3.6 |
| 3,392,943 | 7/1968 | Baxter | 174/58 |
| 4,576,431 | 3/1986 | Thayer | 220/3.6 |
| 4,673,235 | 6/1987 | Conley | 220/3.6 |

Primary Examiner—Stephen Marcus
Assistant Examiner—Gilbert Reece
Attorney, Agent, or Firm—Robert F. Delbridge; Arne I. Fors

[57] ABSTRACT

A wall bracket for mounting an electrical connector for data or communications in an aperture in a wall panel has a box-like body of sheet metal with a base and opposed end walls extending forwardly therefrom. Each end wall has a front mounting flange extending substantially perpendicularly from a front end thereof in an outward direction, and the base having an opening and a pair of mounting tabs extending in opposite directions in the opening from opposite ends of the opening. Each mounting tab has a length sufficient to enable the tab to be bent rearwardly through substantially 180°, after the bracket has been positioned in a wall panel aperture to position the front mounting flanges against a front face of the panel, to cause the tabs to engage a rear face of the panel as rear mounting flanges and enable securing devices to be passed through the front mounting flanges, the wall panel and the rear mounting flanges.

6 Claims, 3 Drawing Sheets

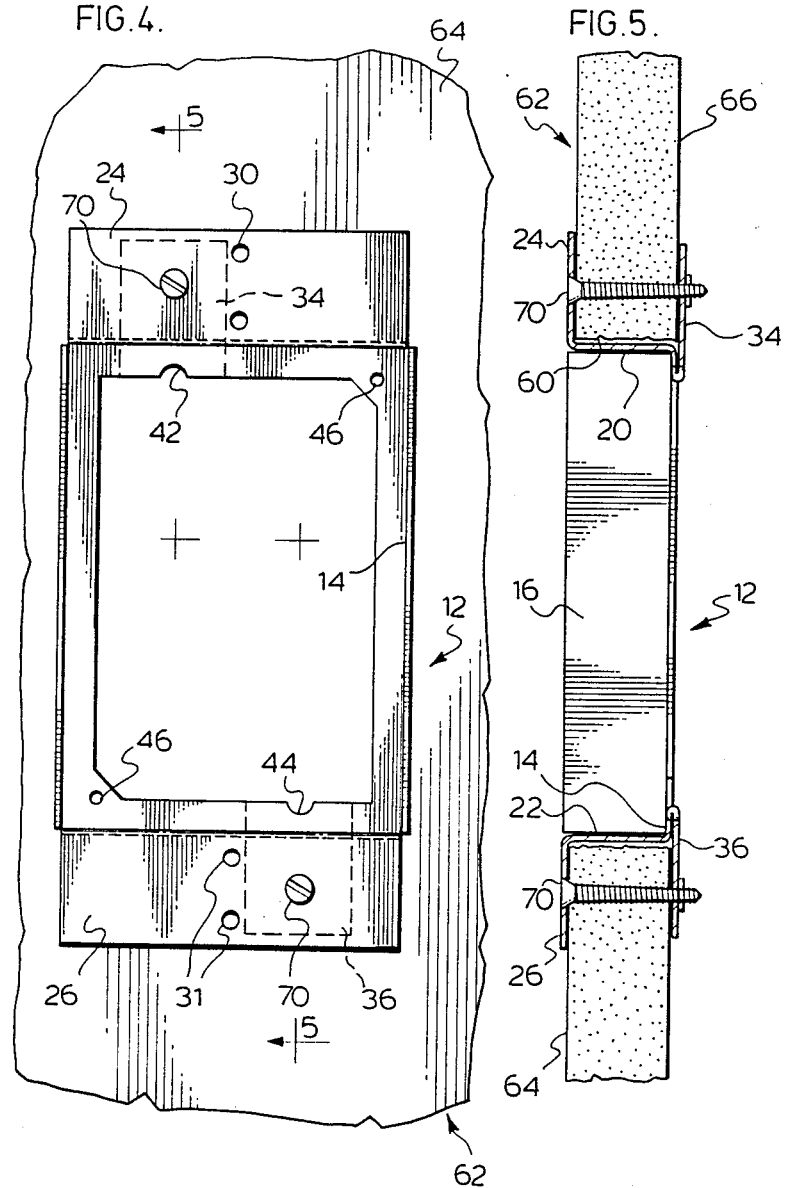

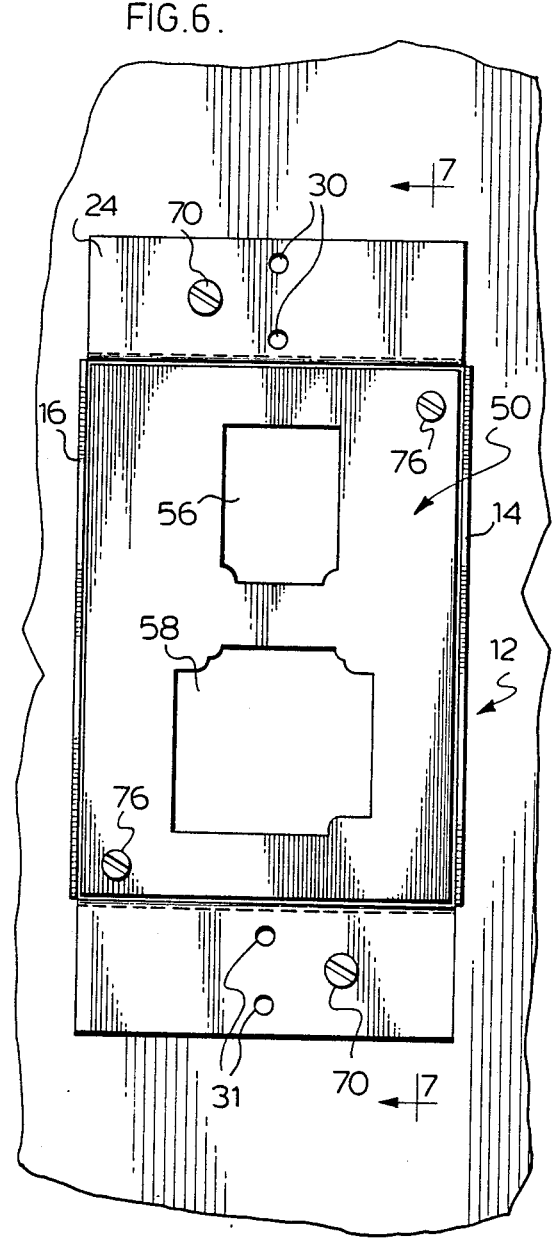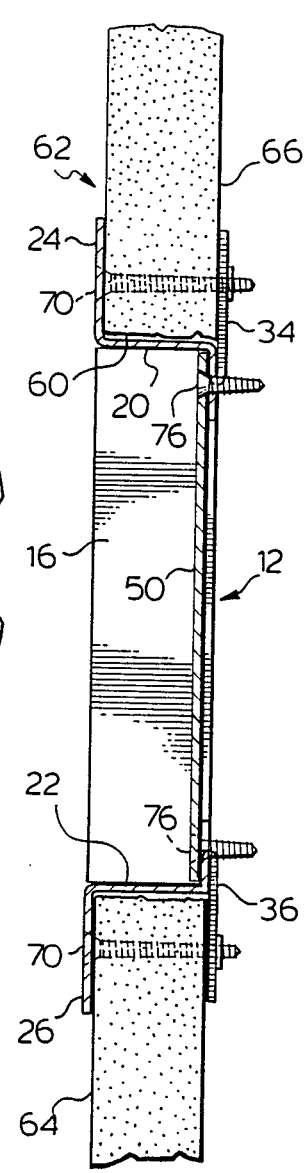

WALL BRACKET FOR MOUNTING AN ELECTRICAL CONNECTOR

This invention relates to wall brackets for mounting electrical connectors for data or communications in an aperture in a wall panel.

Such wall brackets are usually secured by screws which pass through holes in front mounting flanges of the wall brackets into the wall panel. However, such securement is not always suitable. Proposals have been made to also provide mounting flanges at the rear so that the screws can project from the rear of the panel into the rear mounting flanges. Various suggestions have been made in the past in this respect, and involve the provision of separate tabs which are insertable after the wall bracket has been positioned in a panel aperture, as described for example in U.S. Pat. No. 2,044,650 (Thompson) and U.S. Pat. No. 2,299,696 (Gregersen). It has been found that the installation of such wall brackets is not as easy as is desired for an item of this nature.

It is therefore an object of the invention to provide an improved wall bracket which can be mounted in an aperture in a wall panel in a relatively simple manner.

According to the invention, a wall bracket comprises a box-like body of sheet metal having a base with opposed end walls extending forwardly therefrom, each end wall having a front mounting flange extending substantially perpendicularly from a front end thereof in an outward direction. The base has an opening and a pair of mounting tabs extending in opposite directions in the opening from opposite ends of the opening. Each mounting tab has a length sufficient to enable the tab to be bent rearwardly through substantially 180°, after the wall bracket has been positioned in a wall panel aperture to position the front mounting flanges against a front face of the wall panel, to cause the tabs to engage a rear face of the panel as rear mounting flanges and enable securing devices to be passed through the front mounting flanges, the wall panel and the rear mounting flanges.

It is therefore a relatively easy matter to position the bracket body in an aperture in a wall panel, bend the tabs in the manner described above and install the securing devices.

A wall bracket in accordance with the invention may also include an auxiliary plate separate from the box-like body and insertable into the body from the front thereof, after the tabs have been rearwardly bent, to engage the base for securement thereto. The auxiliary plate may be designed for use with specific components depending upon the nature of the installation where the wall bracket is used.

Advantageously, the mounting tabs are laterally offset from each other.

One embodiment of the invention will now be described, by way of example, with reference to the accompanying drawings, of which:

FIG. 4 is a front view of the bracket body secured in an aperture in a wall panel, FIG. 5 is a sectional side view thereof, along the line 5—5 of FIG. 4, FIG. 6 is a front view similar to FIG. 4 but also showing the auxiliary plate secured to the base of the bracket body, and FIG. 7 is a sectional side view thereof along the line 7—7 of FIG. 6.

Figure 1:
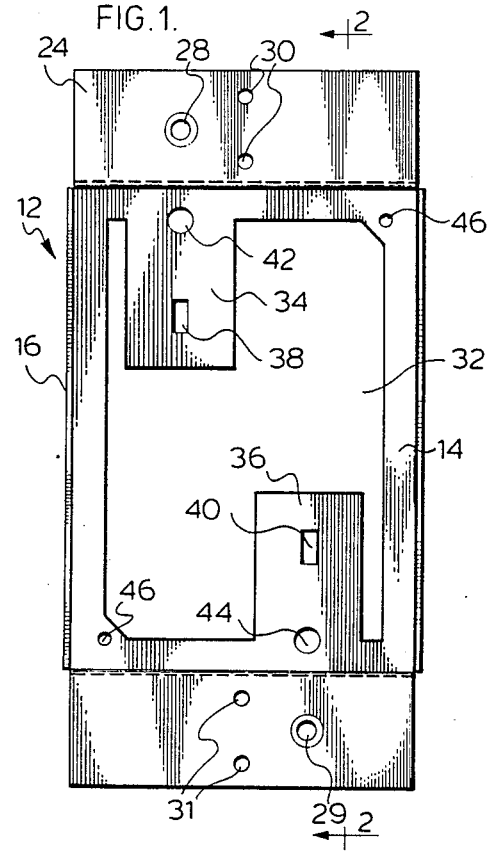
FIG. 1 is a front view of a wall bracket body.
Figure 2:
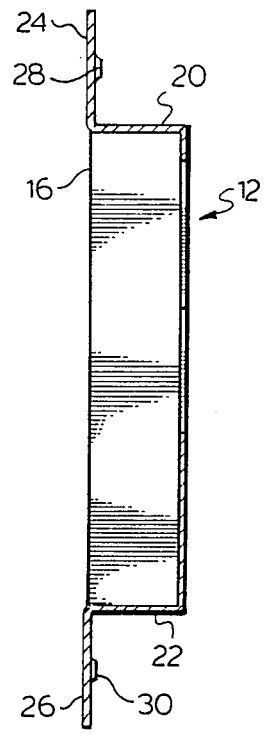
FIG. 2 is a sectional side view thereof along the line 2—2 of FIG. 1.
Figure 3:
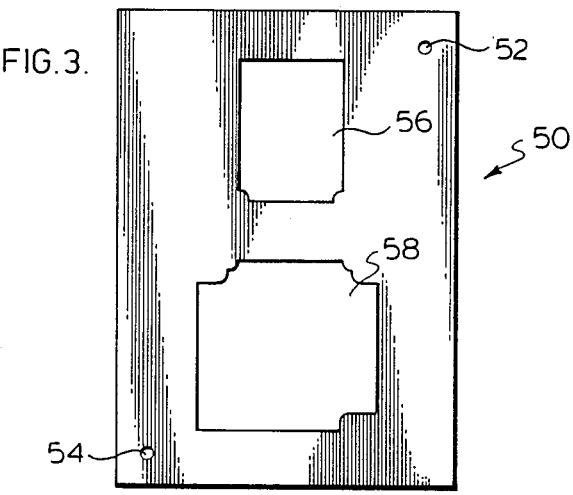
FIG. 3 is a front view of an auxiliary plate.

Referring to the drawings, a wall bracket has a box-like body 12 formed from sheet metal and having a rectangular base 14, and opposed side walls 16, 18 and opposed end walls 20, 22 extending forwardly from the base 14. Each end wall 20, 22 has a front mounting flange 24, 26 extending substantially perpendicularly from its front end in an outward direction. Each front mounting flange 24, 26 has an aperture 28, 29 respectively to receive a securing device for securing the wall bracket to a wall pane, and further pairs of apertures 30, 31 respectively to receive a further securing device for securing a cover thereto as will be described in more detail later. The apertures 28, 29 are laterally offset from one another on opposite side of the apertures 30, 31, which are vertically aligned with each other.

The base 14 has an opening 32 stamped out therefrom to provide a pair of laterally offset mounting tabs 34, 36 extending in the opening 32 from opposite ends of the base. The lateral offset of the apertures 28, 29 corresponds to the lateral offset of the mounting tabs 34, 36. Each mounting tab 34, 36 has a slot 38, 40 respectively adjacent its free end, and a circular aperture 42, 44 respectively adjacent each junction with the remainder of the base 14. The base 14 also has an aperture 46 adjacent each corner. The purpose of slots 38, 40, apertures 42, 44 and apertures 46 will also be described later.

The wall bracket also includes a separate auxiliary rectangular plate 50 shaped to fit into the bracket body 12. The plate 50 has small apertures 52, 54 at diagonally opposite corners to enable the plate 50 to be secured to the base 14, as will be described later, and large apertures 56, 58 of a size and shape to receive components according to the use for which the wall bracket is intended.

In use, and referring now especially to FIGS. 4 and 5, the bracket body 12 is inserted into a rectangular aperture 60 of appropriate size in a wall panel 62 so that the front mounting flanges 24, 26 engage the front face 64 of the wall panel 62. This positions the base 14 substantially flush with the rear face 66 of the wall panel 62. The mounting tabs 34, 36 are then bent rearwardly from the opening 32 through 180° to cause the tabs 34, 36 to engage the rear face 66 of the panel 62. Such bending is facilitated by the apertures 42, 44 which are positioned in the bending axis and accordingly weaken the line of bending.

The length of the tabs 34, 36 is such that the bending positions the slots 38, 40 in the tabs 34, 36 in alignment with the apertures 28, 29 in the front mounting flanges 24, 26. Screws 70, 72 can then be inserted into apertures 28, 29 respectively and screwed through the panel 62 into the slots 38, 40 respectively of the tabs 34, 36, thereby securing the wall bracket 12 to the wall panel 62. The tabs 34, 36 thus become rear mounting flanges.

It will be noted that, after the tabs 34, 36 have been bent to the securing position, a rather large aperture is left in the base 14. As shown in FIGS. 6 and 7, and auxiliary plate 50 of the required type is then inserted into the wall bracket 12 from the front so as to lie against the base 14. The two apertures 52, 54 in the auxiliary plate 50 will become aligned with respective apertures 46 in the base 14, and the auxiliary plate 50 can thus be secured in place by screws 76 passing therethrough.

When appropriate data and communication connections have been completed, a cover of a conventional kind (not shown) can be positioned over the front of the wall bracket 12 and secured thereto by screws (not shown) passing through apertures in the cover and through apertures 30, 31 in the front mounting flanges 24, 26.

The advantages of the invention will be readily appreciated by persons skilled in the art from the foregoing description of a preferred embodiment. The wall bracket is inexpensive and easy to install, and an appropriate auxiliary plate 50 can readily be selected. Where the wall bracket is of substantial width, for example the double or triple units instead of the single unit described, two or more laterally spaced pairs of tabs 34, 36 may be provided.

Other embodiments within the scope of the invention will also be readily apparent to a person skilled in the art, the scope of the invention being defined in the appended claims.

I claim:

1. A wall bracket for mounting an electrical connector for data or communications in an aperture in a wall panel, said bracket comprising a box-like body of sheet metal having a base with opposed end walls extending forwardly therefrom, each end wall having a front mounting flange extending substantially perpendicularly from a front end thereof in an outward direction, and the base having an opening and a pair of mounting tabs extending in opposite directions in the opening from opposite ends of the opening, each mounting tab having a length sufficient to enable the tab to be bent rearwardly through substantially 180°, after the bracket has been positioned in a wall panel aperture to position the front mounting flanges against a front face of the panel, to cause the tabs to engage a rear face of the panel as rear mounting flanges and enable securing devices to be passed through the front mounting flanges, the wall panel and the rear mounting flanges, and an auxiliary plate separate from the box-like body and insertable into the body from the front thereof, after the tabs have been rearwardly bent, to engage the base for securement thereto.

2. A wall bracket according to claim 1 wherein the mounting tabs are laterally offset from each other.

3. A wall bracket for mounting an electrical connector for data or communications in an aperture in a wall panel, said bracket comprising a box-like body of sheet metal having a base with opposed end walls extending forwardly therefrom, each end wall having a front mounting flange extending substantially perpendicularly from a front end thereof in an outward direction, and the base having an opening and a pair of mounting tabs laterally offset from each other an extending in opposite directions in the opening from opposite ends of the opening, each mounting tab having a length sufficient to enable the tab to be bent rearwardly through substantially 180°, after the bracket has been positioned in a wall panel aperture to position the front mounting flanges against a front face of the panel, to cause the tabs to engage a rear face of the panel as rear mounting flanges and enable securing devices to be passed through the front mounting flanges.

4. A wall bracket assembly comprising a wall bracket for mounting an electrical connector for data or communications in an aperture in a wall panel, said wall bracket comprising a box-like body of sheet metal having a base with opposed end walls extending forwardly therefrom, each end wall having a front mounting flange extending substantially perpendicularly from a front end thereof in an outward direction and engaging a front face of the panel, and the base having an opening and a pair of mounting tabs extending from opposite ends of the opening and bent rearwardly therefrom through substantially 180° and engaging a rear face of the panel behind respective front mounting flanges, a pair of securing devices each passing through a respective front mounting flange, the panel and rear mounting flange, an auxiliary plate separate from the box-like body and inserted therein from the front thereof to engage the base, and further securing devices securing the auxiliary plate to the base.

5. A wall bracket assembly according to claim 4 wherein the mounting tabs are laterally offset from each other.

6. A wall bracket assembly comprising a wall bracket for mounting an electrical connector for data or communications in an aperture in a wall panel, said wall bracket comprising a box-like body of sheet metal having a base with opposed end walls extending forwardly therefrom, each end wall having a front mounting flange extending substantially perpendicularly from a front end thereof in an outward direction and engaging a front face of the panel, and the base having an opening and a pair of mounting tabs laterally offset from each other and extending from opposite ends of the opening and bent rearwardly therefrom through substantially 180° and engaging a rear face of the panel behind respective front mounting flanges, a pair of securing devices each passing through a respective front mounting flange, the panel and rear mounting flange.

* * * * *